US012263796B2

(12) United States Patent
Mizuno et al.

(10) Patent No.: US 12,263,796 B2
(45) Date of Patent: Apr. 1, 2025

(54) DOOR WIRING MODULE, SERVICE HOLE COVER AND METHOD OF MANUFACTURING DOOR WIRING MODULE

(71) Applicants: AutoNetworks Technologies, Ltd., Mie (JP); Sumitomo Wiring Systems, Ltd., Mie (JP); SUMITOMO ELECTRIC INDUSTRIES, LTD., Osaka (JP)

(72) Inventors: Housei Mizuno, Osaka (JP); Hiroki Hirai, Osaka (JP); Takuji Otsuka, Osaka (JP); Makoto Higashikozono, Osaka (JP); Koji Yamaguchi, Osaka (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(*) Notice: Subject to any disclaimer, the term of this patent is extended or adjusted under 35 U.S.C. 154(b) by 155 days.

(21) Appl. No.: 18/029,414

(22) PCT Filed: Oct. 6, 2021

(86) PCT No.: PCT/JP2021/036916
§ 371 (c)(1),
(2) Date: Mar. 30, 2023

(87) PCT Pub. No.: WO2022/085444
PCT Pub. Date: Apr. 28, 2022

(65) Prior Publication Data
US 2023/0271569 A1 Aug. 31, 2023

(30) Foreign Application Priority Data

Oct. 20, 2020 (JP) .................................. 2020-176035

(51) Int. Cl.
*H02G 3/30* (2006.01)
*B60R 16/02* (2006.01)
*H02G 3/04* (2006.01)

(52) U.S. Cl.
CPC ....... *B60R 16/0215* (2013.01); *H02G 3/0418* (2013.01); *H02G 3/30* (2013.01)

(58) Field of Classification Search
CPC .. B60R 16/0215; B60R 16/02; H02G 3/0418; H02G 3/30

(Continued)

(56) References Cited

U.S. PATENT DOCUMENTS 5,460,530 A * 10/1995 Toba ................... B60R 16/0207
174/72 A
6,504,262 B1 * 1/2003 Aoki ................... B60R 16/0207
307/9.1

(Continued)

FOREIGN PATENT DOCUMENTS

| JP | 50-9920 | 1/1975 |
| JP | 63-130353 | 8/1988 |
| JP | 5-46608 | 6/1993 |
| JP | 9-277853 | 10/1997 |
| JP | 2005-178616 | 7/2005 |
| JP | 2011-25915 | 2/2011 |

(Continued)

OTHER PUBLICATIONS

International Search Report issued in IInternational Patent Application No. PCT/JP2021/036916, dated Nov. 30, 2021.

*Primary Examiner* — Timothy J Thompson
*Assistant Examiner* — Michael F McAllister
(74) *Attorney, Agent, or Firm* — Greenblum & Bernstein, P.L.C.

(57) ABSTRACT

A door wiring module includes: a service hole cover including a cover body part and a route indication part provided to the cover body part; and a wiring member whose route is regulated so that the wiring member passes through a first position and a second position on the cover body part. The (Continued)

route indication part indicates a plurality of routes each having a route length different from each other as routes of the wiring member between the first position and the second position, and a route of the wiring member is regulated so that the wiring member passes through any route selected from the plurality of routes.

5 Claims, 7 Drawing Sheets

(58) Field of Classification Search
USPC .......................................................... 174/66
See application file for complete search history.

(56) References Cited

U.S. PATENT DOCUMENTS

| 2005/0148213 | A1 | | 7/2005 | Takase et al. |
| 2015/0283962 | A1 | * | 10/2015 | Kobayashi ............... H02G 3/32 |
| | | | | 174/72 A |
| 2022/0017026 | A1 | * | 1/2022 | Yamaguchi .......... H01B 7/0823 |

FOREIGN PATENT DOCUMENTS

| JP | 2015-71333 | 4/2015 |
| JP | 2020-83075 | 6/2020 |

* cited by examiner

DOOR WIRING MODULE, SERVICE HOLE COVER AND METHOD OF MANUFACTURING DOOR WIRING MODULE

TECHNICAL FIELD

The present disclosure relates to a door wiring module, a service hole cover, and a method of manufacturing the door wiring module.

BACKGROUND ART

Patent Document 1 discloses a door wire harness module including a door module panel, a wire harness, and a sheet member. In the door wire harness module described in Patent Document 1 a wire harness is housed in a groove formed in one main surface of the door module panel. The sheet member is attached to one main surface of the door module panel to cover an opening of the groove.

PRIOR ART DOCUMENTS

Patent Document(s)

Patent Document 1: Japanese Patent Application Laid-Open. No. 2015-71333

SUMMARY

Problem to be Solved by the Invention

In a door wiring module in which a wiring member is held by a service hole cover as with the door wire harness module described in Patent Document 1, plural part numbers of door wiring modules are necessary to deal with specifications of a plurality of doors different from each other in some cases. In this case, when a component constituting the door wiring module is changed for each part number, cost increases for the component.

Accordingly, an object is to provide a technique capable of manufacturing a door wiring module dealing with specifications of a plurality of doors using a common component as much as possible.

Means to Solve the Problem

A door wiring module according to the present disclosure is a door wiring module including: a service hole cover including a cover body part and a route indication part provided to the cover body part; and a wiring member whose route is regulated so that the wiring member passes through a first position and a second position on the cover body part, wherein the route indication part indicates a plurality of routes each having a route length different from each other as routes of the wiring member between the first position and the second position, and a route of the wiring member is regulated so that the wiring member passes through any route selected from the plurality of routes.

Effects of the Invention

According to the present disclosure, a door wiring module dealing with specifications of a plurality of doors can be manufactured using a common component as much as possible.

DESCRIPTION OF EMBODIMENT(S)

Description of Embodiment of Present Disclosure

Figure 1:
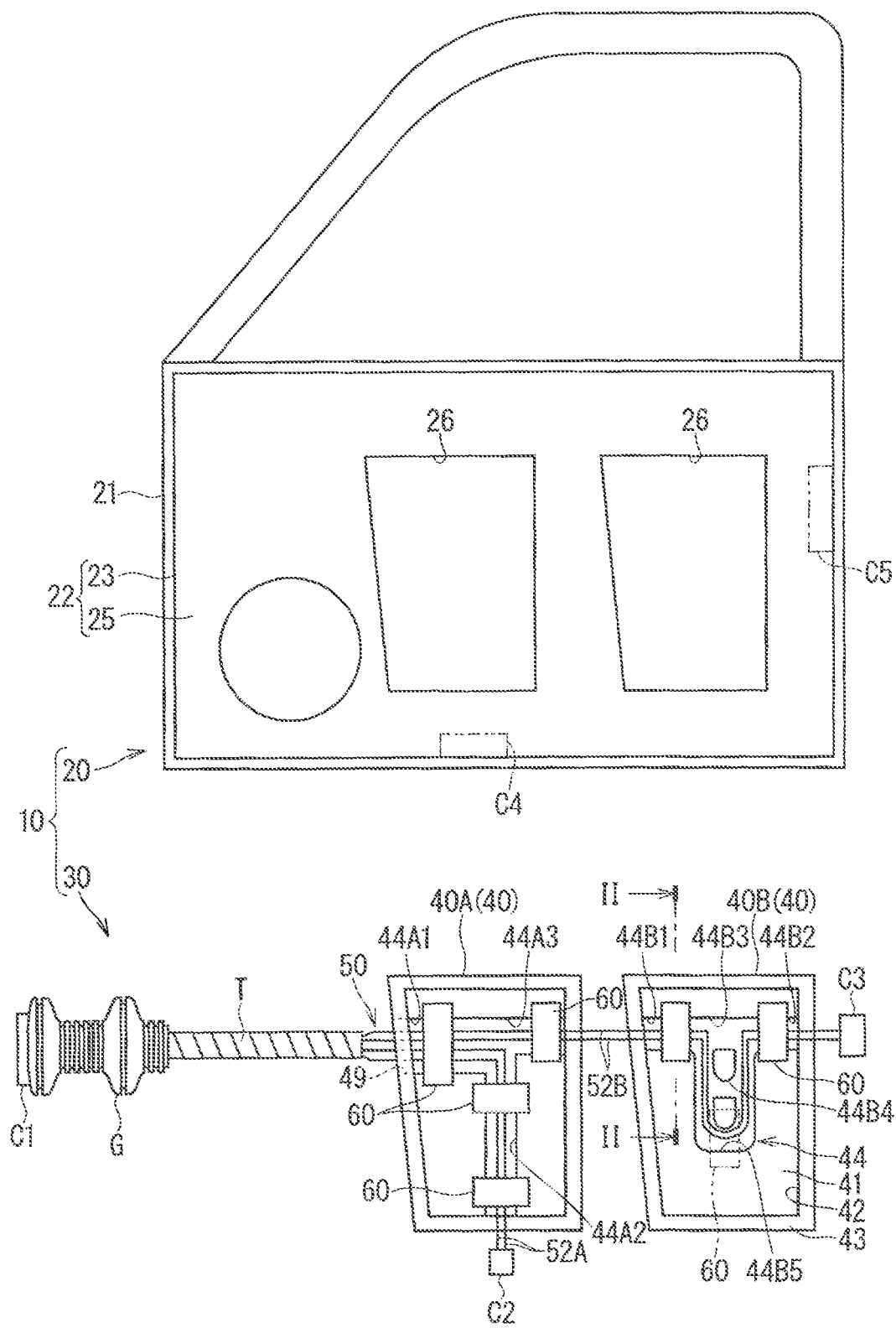
FIG. 1 is a plan view illustrating a door wiring module according to an embodiment 1 and a door panel into which the door wiring module is incorporated.

Embodiments of the present disclosure are listed and described firstly.

A door wiring module according to the present disclosure is as follows.

(1) A door wiring module includes: a service hole cover including a cover body part and a route indication part provided to the cover body part; and a wiring member whose route is regulated so that the wiring member passes through a first position and a second position on the cover body part, wherein the route indication part indicates a plurality of routes each having a route length different from each other as routes of the wiring member between the first position and the second position, and a route of the wiring member is regulated so that the wiring member passes through any route selected from the plurality of routes. The route indication part indicates the plurality of routes each having the route length different from each other as the routes of the wiring member between the first position and the second position, and a route of the wiring member is regulated so that the wiring member passes through any route selected from the plurality of routes, Accordingly, any route selected from the plurality of routes is applied to the route of the wiring member using the longest wiring member in specifications of the plurality of doors, thus the wiring member can deal with the specifications of the plurality of doors. Accordingly, common components can be used for the service hole cover and the wiring member.

(2) In the door wiring module according to (1), it is also applicable that the route indication part is formed on a main surface of the cover body part to extend along each of the plurality of routes, and includes a plurality of grooves housing the wiring member. Accordingly, the wiring member is housed in a predetermined groove, thereby being easily disposed along a predetermined route.

(3) In the door wiring module according to (1) or (2), the route indication part may include a fixing part formed in a position corresponding to each of the plurality of routes on the main surface of the cover body part to fix the wiring member. Accordingly, the wiring member is fixed by a predetermined fixing part, thus the route thereof is easily kept in a state of being regulated to a predetermined route.

(4) In the door wiring module according to any one of (1) to (3), the route indication part may include a mark formed in a position corresponding to each of the plurality of routes on the main surface of the cover body part. Accordingly, the wiring member is disposed along a predetermined mark, thereby being easily disposed along a predetermined route.

(5) In the door wiring module according to any one of (1) to (4), it is also applicable that the route of the wiring member is regulated so that the wiring member passes through a first route in the plurality of routes, and the wiring member further includes a dedicated wiring member whose route is regulated so that the dedicated wiring member passes through a second route in the plurality of routes. For example, the wiring member passing through the first position and the second position may include a dedicated wiring member especially designed for each of specifications of a plurality of doors and a general wiring member commonly used in the specifications of the plurality of doors. In this ease, a route of the general wiring member is changed, thus the dedicated wiring member and the general wiring member can be simply disposed along a predetermined route in the service hole cover.

(6) A service hole cover according to the present disclosure is a service hole cover including: a cover body part; and a route indication part provided to the cover body part; wherein the route indication part indicates a plurality of routes each having a route length different from each other as routes, between a first position and a second position, of a wiring member disposed to pass through the first position and the second position on the cover body part. The route indication part indicates the plurality of routes each having the route length different from each other as the routes, between the first position and the second position, of the wiring member disposed to pass through the first position and the second position on the cover body part. Accordingly, any route selected from the plurality of routes is applied to the route of the wiring member using the longest wiring member in specifications of the plurality of doors, thus the wiring member can deal with the specifications of the plurality of doors. Accordingly, common components can be used for the service hole cover and the wiring member.

(7) A method of manufacturing a door wiring module according to the present disclosure is a method of manufacturing a door wiring module including: a preparation step of preparing a service hole cover including a cover body part and a route indication part provided to the cover body part; and a route regulation step of regulating a route of a wiring member so that the wiring member passes through a first position and a second position on the cover body part, wherein the route indication part indicates a plurality of routes each having a route length different from each other as routes between the first position and the second position, and in the route regulation step, a route of the wiring member is regulated so that the wiring member passes through any route in the plurality of routes indicated by the route indication part as a route between the first position and the second position. The route indication part indicates the plurality of routes each having the route length different from each other as the routes between the first position and the second position, and in the route regulation step, the route of the wiring member is regulated so that the wiring member passes through any route in the plurality of routes indicated by the route indication part as the route between the first position and the second position. Accordingly, any route selected from the plurality of routes is applied to the route of the wiring member using the longest wiring member in specifications of the plurality of doors, thus the wiring member can deal with the specifications of the plurality of doors. Accordingly, common components can be used for the service hole cover and the wiring member.

Details of Embodiment of Present Disclosure

Specific examples of a door wiring module of the present disclosure are described hereinafter with reference to the drawings. The present disclosure is not limited to these examples, but is indicated by claims, and it is intended that meanings equivalent to claims and all modifications within a scope of claims are included.

Embodiment 1

Figure 2:
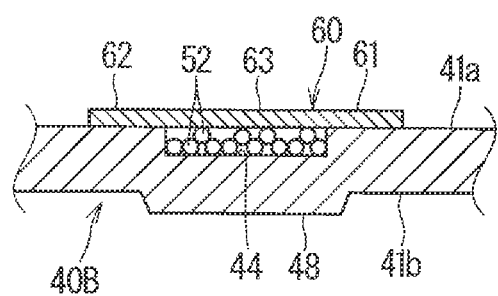
FIG. 2 is a cross-sectional view along a II-II line in FIG. 1.

A door wiring module according to an embodiment is described hereinafter. FIG. 1 is a plan view illustrating a door wiring module 30 according to the embodiment 1 and a door panel 20 into which the door wiring module 30 is incorporated. FIG. 2 is a cross-sectional view along a II-II line in FIG. 1.

Firstly, an outline of a door 10 in a vehicle is described. The door 10 is formed into a flat shape as a whole, and is a part operable and closable to partition an inner side and outer side of a vehicle. The door 10 is assumed to be a driver side door, a passenger's side door, and a rear seat door, for example. The door 10 includes a door panel 20, a design trim, and the door wiring module 30.

The door panel 20 includes an outer panel 21 and an inner panel 22. The outer panel 21 is provided to a portion of the door 10 facing an outer side of the vehicle to constitute an appearance of the vehicle together with a body part. The inner panel 22 is provided to a vehicle interior side of the outer panel 21. The inner panel 22 includes a side plate part 23 and a main plate part 25. The side plate part 23 is a part protruding from the outer panel 21 to the inner side of the vehicle. The main plate part 25 is a part continuing into the side plate part 23, and extends along the outer panel 21 with a distance from the outer panel 21. A space is formed between the outer panel 21, the main plate part 25, and the side plate part 23. A door apparatus provided to the door 10 is disposed and a window glass is housed in the space. A service hole 26 is provided to the main plate part 25 of the inner panel 22. An operator can have access to the space between the outer panel 21 and the inner panel 22 via the service hole 26 from an outer side of the inner panel 22. In the description of the present example, two service holes 26 are provided to the inner panel 22. A planar shape of two service holes 26 may be the same or different from each other. Two service holes 26 are arranged in a front-back direction of the vehicle, but may also he arranged in a height direction of the vehicle or an oblique direction intersecting with the front-back direction and the height direction.

The design trim is a part provided in a part of the door 10 facing the inner side of the vehicle to constitute the interior of the vehicle. An inner handle and an operation part of an in-vehicle apparatus, for example, are attached to the design trim. A portion of the door wiring module 30 incorporated into the door 10 is disposed between the design trim and the outer panel 21.

The door wiring module 30 includes a service hole cover 40. a wiring member 50, and a wiring cover 60.

The service hole cover 40 covers the service hole 26. Herein, the service hole covers 40 different from each other cover two service holes 26, respectively. Accordingly, the door wiring module 30 herein includes two service hole covers 40. In the description hereinafter, when two service hole covers 40 need to be distinguished from each other, two service hole covers 40 may be referred to as the service hole covers 40A and 40B by adding signs A and B in some cases. When two service hole covers 40A and 40B need not be distinguished from each other, two service hole covers 40A and 40B are simply referred to as the service hole covers 40 in some cases, However, one service hole cover may cover two service holes 26.

The service hole cover 40 is a flat resin component extending to a range approximately equal to or wider than the corresponding service hole 26. The service hole cover 40 is attached to cover the service hole 26. An attachment state where the service hole cover 40 is attached to the service hole 26 of the inner panel 22 is held by screwing, a locking structure, or adhesion, for example. For example, when a peripheral Part of the service hole cover 40 overlapped with the inner panel 22 is bonded to the inner panel 22, a gap therebetween can be practicably covered.

The service hole cover 40 partitions the inner side of the vehicle of the space between the outer panel 21 and the inner panel 22. The window glass exposed to a rainwater environment is housed in the space, and a slit-like opening through which the window glass goes in and out s formed on an upper side of the space. Thus, the space is a space which water may enter. The space is a space which may be connected to an outer space, thus is also a space which a wind noise, for example, may enter from outside. Thus, it is sufficient that the service hole cover 40 is provided as a member for completely partitioning a vehicle interior space and an outer space with the inner panel 22. More specifically, the service hole cover 40 includes a cover body part 41, a frame part 42, a flange part 43, and a route indication part. For example, the service hole cover 40 is a component made up of molded resin such as polypropylene (PP), and has rigidity of hardly bonded.

The cover body part 41 is a portion planarly extend to a range slightly smaller than the service hole 26. The frame part 42 is formed to protrude to a side of one main surface 41a (inner side of the vehicle) of the cover body part 41 from an outer edge of the cover body part 41, The flange part 43 is formed to protrude to a side of an outer periphery from an outer edge of the frame part 42. It is sufficient that the frame part 42 is formed to have an inclined surface with a gradually decreasing height dimension from the flange part 43 toward the cover body part 41, The cover body part 41 is disposed on an inner side of the service hole 26 (closer to a side of the outer panel 21 than the main plate part 25) while the service hole cover 40 is attached to a predetermined position of the service hole 26 of the inner panel 22, the flange part 43 is disposed on an outer side of the service hole 26 (closer to the inner side of the vehicle than the main plate part 25), and the frame part 42 connects the cover body part 41 and the flange part 43. Accordingly, the frame part 42 and the flange part 43 cover a portion between a peripheral edge portion of the cover body part 41 and an opening edge portion of the service hole 26.

A groove 44 is formed in a main surface of the service hole cover 40 (the main surface 41a of the cover body part 41). Herein, the groove 44 is formed in the main surface 41a of the service hole cover 40 directed to the inner side of the vehicle. The groove 44 may be formed in the main surface 41b of the service hole cover 40 directed to the outer side of the vehicle. The groove 44 may he formed in both the main surfaces 41a and 41b.

The groove 44 is formed to have a size capable of collectively housing the plurality of wiring members 50. The groove 44 is flatly formed so that a width dimension thereof is larger than a depth dimension thereof. It is sufficient that the depth dimension of the groove 44 is larger than a diameter of the wiring member 50 (in a case where the plurality of wiring members 50 include a wiring member with a different thickness, a diameter of the maximum wiring member 50). It is sufficient that the depth dimension of the groove 44 is more than twice as large as the diameter of the wiring member 50 (in a case where the plurality of wiring members 50 include a wiring member with a different thickness, a diameter of the minimum wiring member 50) so that the wiring members 50 can be stacked in two or more layers and housed therein. A plurality of grooves each having a size capable of separately housing the plurality of wiring members 50 may be formed in parallel to each other as the groove 44, For example, a plurality of grooves each having a size to house one wiring member 50 may be formed in parallel to each other.

A portion located on a side opposite to the groove 44 in the main surface 41b on a side opposite to the main surface 41a in which the groove 44 is formed is a convexed part 48. Accordingly, reduction of a thickness of a portion where the groove 44 is formed is suppressed. However, the portion located on a side opposite to the groove 44 in the main surface 41b may not be the convexed part 48. The portion located on the side opposite to the groove 44 and a surrounding portion in the main surface 41b may be flat.

The groove 44 of the service hole cover 40B functions as a route indication part.

An insertion hole 49 through which the wiring member 50 passes is formed in the service hole cover 40A. The wiring member 50 passes through the service hole cover 40 through the insertion hole 49. It is sufficient that the insertion hole 49 is formed in the cover body part 41 or the frame part 42 in the service hole cover 40. Herein, the insertion hole 49 is formed in the frame part 42. Particularly, the insertion hole 49 is formed in a position of an end portion of the groove 44 in the frame part 42 herein. Accordingly, the wiring member 50 housed in the groove 44 can pass through the service hole cover 40 through the insertion hole 49.

The wiring member 50 connects the door apparatus and a vehicle body apparatus provided to a vehicle body to supply electrical power to the door apparatus or transmit a signal between the door apparatus and the vehicle body apparatus. The wiring member 50 may include an electrical wire 52. A covering wire having a core wire made up of a conductor with a covering layer around the core wire can be used as the electrical wire 52. The core wire may be a single core wire or a stranded wire. A type of the electrical wire 52 is not particularly limited, but can include a single wire or a composite wire. The single wire is an electrical wire having one conductive route. The composite wire is an electrical wire having a plurality of conductive routes. Applicable as the composite wire is a twisted wire or a composite cable, for example, formed of a plurality of single wires combined with each other. The wiring member 50 may include an optical fiber cable, for example. The number of the wiring members 50 is set in accordance with the number of the door apparatuses. The plurality of wiring members 50 are normally provided.

A route of the plurality of wiring members 50 is appropriately set in accordance with a specification of the door 10. For example, in a case of a general hinge door having a rotational axis extends along a height direction of a vehicle, the plurality of wiring members 50 assembled to the hinge door is normally connected to a vehicle body at a position near a door hinge, and are branched at a time of being directed from a side of the door hinge toward a side opposite to the door hinge to be connected to various types of door apparatus.

More specifically, it is assumed that one end portions of the plurality of wiring members 50 go through a part of the door 10 (the side plate part 23 on the side of the door hinge in the example illustrated in FIG. 1) to extend from the door 10 in a bundled state, and is led inside the vehicle body to be connected to the vehicle body apparatus via a common connector C1, for example, or a relay connector provided to an end portion of a wiring member extending from the vehicle body apparatus. The vehicle body apparatus is not particularly limited, but is assumed to be an electric control unit (ECU) or a battery, for example. A grommet G is normally attached to a portion of the plurality of wiring members 50 extending between the door 10 and the vehicle body. In the example illustrated in FIG. 1, the grommet G is a so-called feed-through grommet inserted and locked to a through hole formed in the side plate part 23. Accordingly, ingress of water through the through hole is suppressed. The grommet G may be a so-called non-feed-through grommet fitted into a concave part formed in an edge portion where the side plate part 23 and the main plate part 25 meet. The plurality of wiring members 50 extend from the grommet G on a way from one end portion to the other portion, and are branched and extend toward the door apparatus as connection destinations, respectively. Connectors C2 and C3 corresponding to the door apparatuses as the connection destinations, respectively, are attached to the other end portions of the plurality of wiring members 50. The connectors C2 and C3 are connected to connectors C4 and C5 on sides of the door apparatuses, respectively, for example. FIG. 1 and FIG. 2 exemplify the connectors C4 and C5 on the sides of two door apparatuses and electrical wires 52A and 52B connected to the connectors C4 and C5 via the connectors C2 and C3, respectively. The connector C4 is a connector for a foot light, for example. The connector C5 is a connector for an actuator for locking and unlocking the door 10, for example.

In FIG. 1 and FIG. 2, illustration of a connector and the wiring member 50 other than the connectors C1 to C3 and the electrical wires 52A and 52B connected to the connectors C1 to C3 is omitted in the door wiring module 30. Needless to say, the door wiring module 30 may include a connector other than the connectors C1 to C3 or the wiring member 50 other than the electrical wires 52A and 52B. In the description hereinafter, when the electrical wires 52A and 52B need not be distinguished from each other, each of the electrical wires 52A and 52B is simply referred to as the electrical wire 52 in some cases.

A section in the electrical wire 52 extending between the grommet G and the service hole cover 40 may be a banded wire portion bundled by a banding member. In the example illustrated in FIG. 1, the plurality of electrical wires 52 are handed by an adhesive tape T spirally wound. The banding member may be a banding band, a flexible sheet, or a corrugate tube, for example. It is sufficient that the banding member bands the plurality of electrical wires 52 in a state where the plurality of electrical wires 52 can be banded.

The electrical wire 52 passes through the service hole cover 40A through the insertion hole 49 on a way from a portion provided with the grommet C1 toward the connectors C2 and C3, and extends closer to the inner side of the vehicle than the service hole cover 40A. It is also applicable that the electrical wire 52 passes through a hole in the inner panel 22 other than the service hole 26 on a way from a portion provided with the grommet G toward the connectors C2 and C3 and extend closer to the inner side of the vehicle than the inner panel 22.

A section in the electrical wire 52 extending along the service hole cover 40 is disposed closer to the inner side of the vehicle than the service hole cover 40. A route of a section in the electrical wire 52 extending along the service hole cover 40 is regulated by the service hole cover 40. The state where the route of the electrical wire 52 is regulated indicates that the route of the electrical wire 52 is maintained in a predetermined route.

A section in the electrical wire 52 extending along the service hole cover 40A is housed in three grooves 44A1, 44A2, and 44A3. The grooves 44A1, 44A2, and 44A3 are formed along a route of the electrical wire 52 in relation to the service hole cover 40A. The groove 44A1 is formed along the front-back direction of the vehicle from a front portion to a back portion of the service hole cover 40. When the service hole cover 40 is observed from the vehicle interior side, the groove 44A1 is linearly formed to extend along the front-back direction of the vehicle. The grooves 44A2 and 44A3 are branched from an end portion of the groove 44A1. The groove 44A2 is linearly formed to extend along the front-back direction of the vehicle. The groove 44A3 is linearly formed to extend along the height direction of the vehicle. Each groove 44 needs not linearly extend on the main surface 41a of the cover body part, but may be bended and extend on the main surface 41a of the cover body part.

The electrical wires 52A and 52B are branched into two branch wire parts from one main wire part in the branch part on the service hole cover 40A. The main wire part is a portion where the electrical wires 52A and 52B are parallelly arranged. Two branch wire parts are portions where the electrical wires 52A and 52B extend independently. The main wire part is housed in the groove 44A1, and two branch wire parts are housed in the grooves 44A2 and 44A3, respectively. The grooves 44A1 and 44A2 can be used to hold the electrical wire 52A connected to the door apparatus incorporated into a lower portion of the door 10 such as a foot light, for example. The grooves 44A1 and 44A3 can be used to hold the electrical wire 52B connected to the door apparatus incorporated into a back portion of the door 10 such as an actuator for locking and unlocking the door, for example. The groove 44A1 housing the main wire part in a cross-sectional view may be formed to have a size larger than the grooves 44A2 and 44A3 each housing the branch wire part in a cross-sectional view.

The electrical wire 52B extends from the service hole cover 40A to be directed toward the service hole cover 40B. The electrical wire 52B is housed in the groove 44 in the service hole cover 40B. The grooves 44B1 and 44B2 are formed in the service hole cover 40B. Three grooves 44B3, 44B4, and 44B5 connecting the grooves 44B1 and 44B2 with route lengths different from each other are formed in the service hole cover 40B. The groove 44B3 connects the grooves 44B1 and 44B2 with a shortest distance. The groove 44B4 connects the grooves 44B1 and 44B2 with a route length longer than the groove 44B3. The groove 44B5 connects the grooves 44B1 and 44B2 with a route length longer than the groove 44B4. The grooves 44B1 and 44B2 are the first position and the second position on the cover body part 41. The grooves 44B3, 44B4, and 44B5 are examples of the route indication part indicating a plurality of routes each having a route length different from each other as a route of the electrical wire 52 between the first position and the second position. The route indication part includes the plurality of grooves 44B3, 44B4, and 44B5 formed to extend along each of the plurality of routes on the main surface 41a of the cover body part 41 to house the wiring member 50.

The route of the electrical wire 52B is regulated so that the electrical wire 52B passes through the grooves 44B1 and 44B2. Both end portions of a section in the electrical wire 52B extending along the service hole cover 40B are housed in the grooves 44B1 and 44B2, respectively. The electrical wire 52B is regulated to pass through any route selected from the plurality of routes between the grooves 44B1 and 44B2. An intermediate portion of a section in the electrical wire 52B extending along the service hole cover 40B is housed in any of the grooves 44B3, 44B4 and 44B5. Three routes need not be provided as the route between the grooves 44B1 and 44B2, but two or four or more routes may also be provided. Herein, the other two or more detour routes (grooves 44B4 and 44B5) are arranged on one side for a shortest route (groove 44B3) as the route between the grooves 44B1 and 44B2. The other two or more detour routes may be separately arranged on both sides of the shortest route (groove 44B3) as the route between the grooves 44B1 and 44B2.

The plurality of electrical wires 52 are housed in the groove 44 in a state of being free from each other. The state of being free from each other indicates a state where the plurality of electrical wires 52 are not banded by a banding member. The plurality of electrical wires 52 are located separately one by one in the groove 44. A section in the plurality of electrical wires 52 disposed on the service hole cover 40 is in a banded state by being housed in the groove 44 and covered by the wiring cover 60. The plurality of electrical wires 52 may be housed in the groove 44 while being banded by the banding member.

The wiring cover 60 is fixed to the service hole cover 40. The wiring cover 60 covers the opening of the groove 44. The wiring cover 60 may be formed into a plate-like shape to be disposed to extend across the groove 44 on the upper portion of the groove 44, for example. A first end portion 61 and a second end portion 62 of the wiring cover 60 protrude to both sides of the groove 44. An intermediate portion 63 of the wiring cover 60 connecting the first end portion 61 and the second end portion 62 covers the upper side of the groove 44. The first end portion 61 and the second end portion 62 are attached to the main surface 41a of the service hole cover 40 by bonding or fusion, for example.

Alternation Example of Specification

Figure 3:
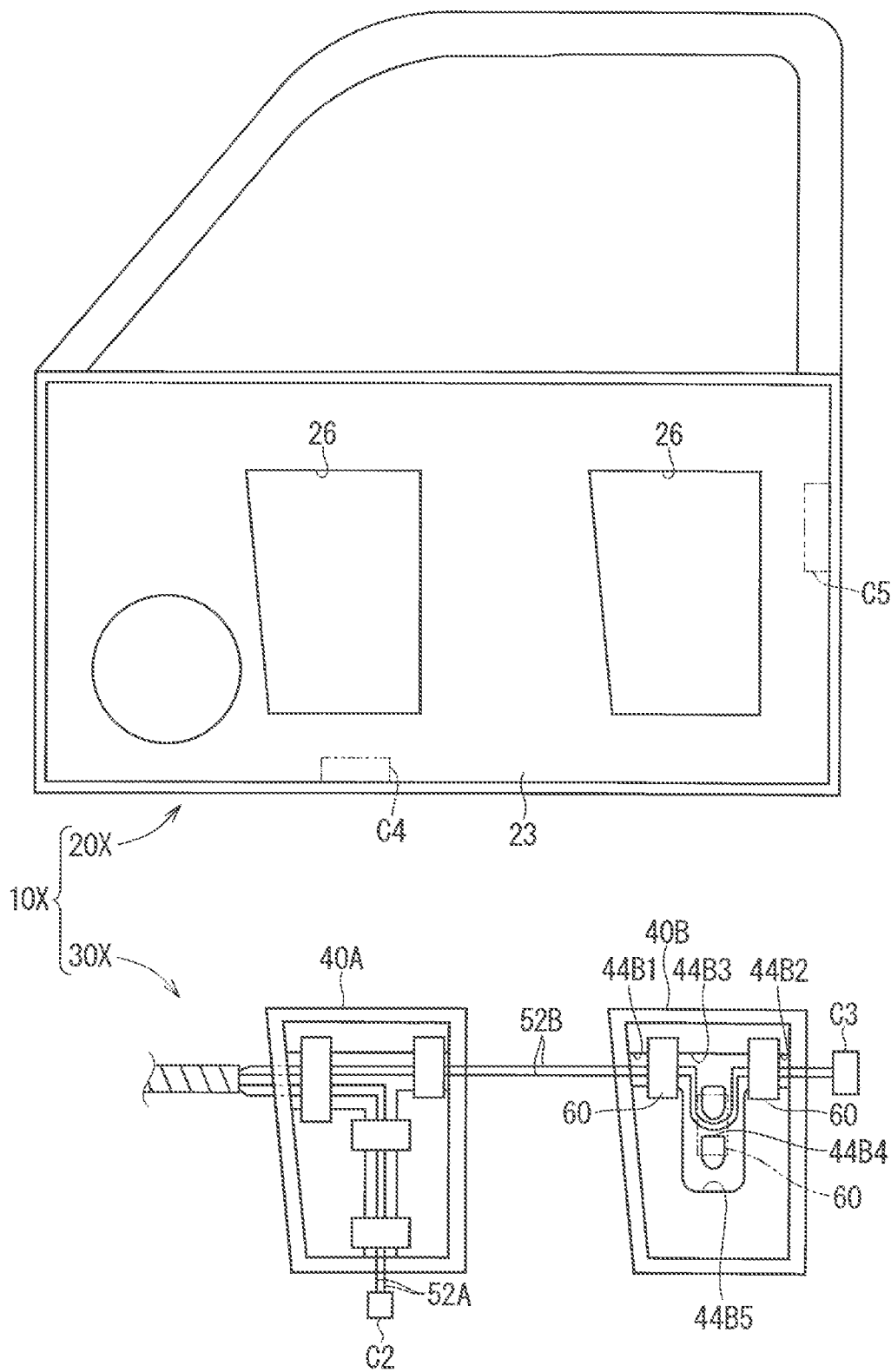
FIG. 3 is a plan view illustrating an alternation example of a first specification of the door wiring module according to the embodiment 1 and the door panel into which the door wiring module according to the alternation example of the first specification is incorporated.
Figure 4:
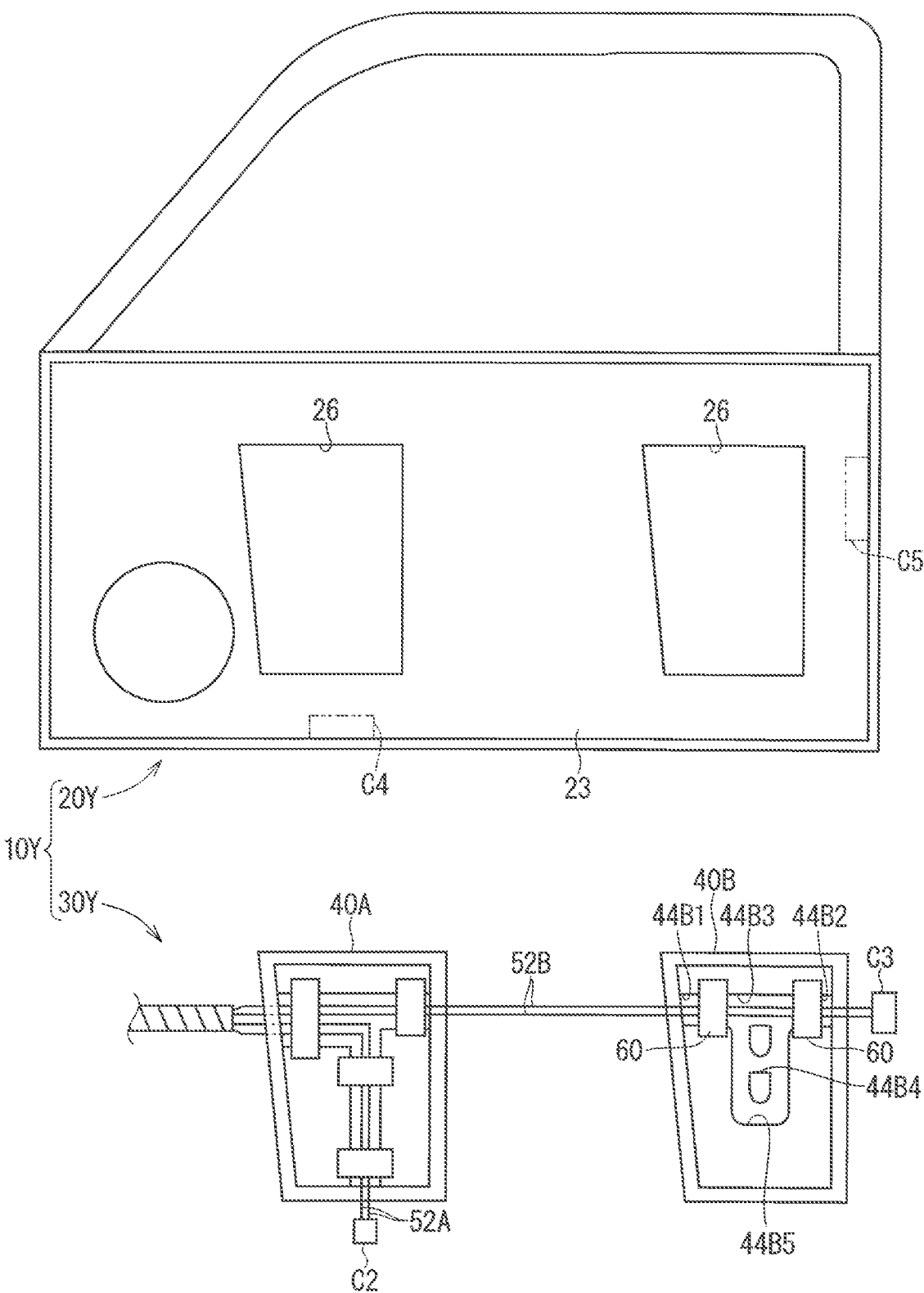
FIG. 4 is a plan view illustrating an alternation example of a second specification of the door wiring module according to the embodiment 1 and the door panel into which the door wiring module according to the alternation example of the second specification is incorporated.

FIG. 3 is a plan view illustrating an alternation example of a first specification of the door wiring module 30 according to the embodiment 1 and a door panel 20X into which the alternation example of the first specification thereof is incorporated. FIG. 4 is a plan view illustrating an alternation example of a second specification of the door wiring module 30 according to the embodiment 1 and a door panel 20Y into which the alternation example of the second specification thereof is incorporated.

A door wiring module 30X according to the alternation example of the first specification and a door wiring module 30Y according to the alternation example of the second specification are manufactured using the electrical wire 52B and the service hole cover 40B in common with the door wiring module 30. A route of the electrical wire 52B in the service hole cover 40B is different between three door wiring modules 30, 30X, and 30Y. This difference of the route of the electrical wire 52B is caused by a difference of a specification between three doors 10, 10X, and 10Y. Described herein as a simple example of the difference of the specification between the doors 10, 10X, and 10Y is an example that a length dimension of each of three door panels 20, 20X, and 20Y in the front-back direction of the vehicle is different from each other.

The door panel 20X has the length dimension in the front-back direction of the vehicle longer than the door panel 20 described above. The door panel 20Y has the length dimension in the front-back direction of the vehicle longer than the door panels 20 and 20X described above. Accordingly, a length dimension necessary for the electrical wire 52B is longest when being incorporated into the door panel 20Y. Thus, the length dimension of the electrical wire 52B is a length dimension assuming a case of being incorporated into the door panel 20Y. The electrical wire 52B having the length dimension corresponding to the door panel 20Y is also applied to the door wiring modules 30 and 30X incorporated into the door panels 20 and 20X to communalize the electrical wire 52B. Accordingly, an excessive length occurs in the electrical wire 52B in the door wiring modules 30 and 30X, and the excessive length is absorbed in the service hole cover 40B. At this time, the route indication part indicates three routes (including a route in which the excessive length needs not be absorbed) which can appropriately absorb the excessive length of the electrical wire 52B as the routes corresponding to the door panels 20, 20X, an d20Y, respectively. The electrical wire 52B is disposed along one of the plurality of routes indicated by the route indication part in accordance with the manufactured door wiring module in three door wiring modules 30, 30X, and 30Y.

More specifically, in the door wiring module 30Y, the route of the electrical wire 52B is regulated so that the electrical wire 52B passes through the groove 44B3 having the shortest route length in three grooves 44B3 to 44B5 connecting two grooves 44B1 and 44B2 in the service hole cover 40B. In the door wiring module 30X, the route of the electrical wire 52B is regulated so that the electrical wire 52B passes through the groove 44B4 having the second shortest route length in three grooves 44B3 to 44B5 connecting two grooves 44B1 and 44B2 in the service hole cover 40B. In the door wiring module 30, the route of the electrical wire 52B is regulated so that the electrical wire 52B passes through the groove 44B5 having the longest route length in three grooves 44B3 to 44B5 connecting two grooves 44B1 and 44B2 in the service hole cover 40B.

Needless to say, the difference of the specification of the door changing the route of the electrical wire 52B in the service hole cover 40B is not limited to this example, however, any difference of the specification is applicable as long as the door wiring module can deal with specifications using common components (the electrical wire 52B and the service hole cover 40B). For example, the difference of the specification of the door may be a difference of a route of a portion of the electrical wire 52B closer to the connector C1 than a portion whose route is regulated by the service hole cover 40B.

Manufacturing Method

Figure 5:
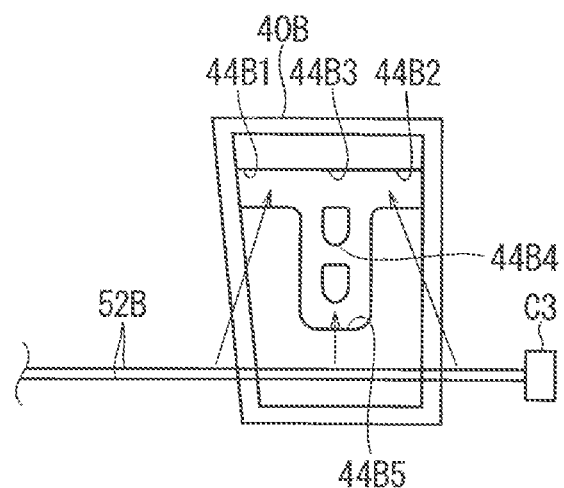
FIG. 5 is a diagram for explaining a method of manufacturing the door wiring module according to the embodiment 1.

A method of manufacturing a door wiring modules 30, 30X, and 30Y is described next. FIG. 5 is a diagram for explaining the method of manufacturing the door wiring module 30.

The method of manufacturing the door wiring modules 30, 30X, and 30Y includes a preparation step and a route regulation step. The preparation step is a step of preparing the service hole cover 40 including the cover body part 41 and the route indication part provided to the cover body part 41. The route regulation step is a step of regulating the route of the wiring member 50 so that the wiring member 50 passes through the first position and the second position on the cover body part 41. Herein, the route indication part in the service hole cover 40 indicates the plurality of routes each having the route length different from each other as the routes between the first position and the second position. In the route regulation step, the wiring member 50 is regulated to pass through any route in the plurality of routes indicated by the route indication part as the route between the first position and the second position.

Specifically, the service hole cover 40B in which the grooves 44B1 to 44B5 are formed is prepared herein. The grooves 44B1 and 44B2 are formed in positions corresponding to the first position and the second position on the cover body part 41. The route of the wiring member 30 is regulated so that the wiring member 50 passes through the grooves 44B1 and 44B2. The grooves 44B3 to 44B5 are provided as the route indication parts. The route of the wiring member 50 is regulated so that the wiring member 50 passes through any of the grooves 44B3 and 44B5 as the route between the grooves 44B1 and 44B2. For example, when the door wiring module 30 illustrated in FIG. 1 is manufactured, the route of the wiring member 50 is regulated so that the wiring member 50 passes through the groove 44B5 as the route between the grooves 44B1 and 44B2. For example, when the door wiring module 30X illustrated in FIG. 3 is manufactured, the route of the wiring member 50 is regulated so that the wiring member 50 passes through the groove 44B4 as the route between the grooves 44B1 and 44B2. For example, when the door wiring module 30Y illustrated in FIG. 4 is manufactured, the route of the wiring member 50 is regulated so that the wiring member 50 passes through the groove 44B3 as the route between the grooves 44B1 and 44B2. As described above, manufactured are the door wiring modules 30, 30X, and 30Y in which the electrical wire 52B is disposed along the appropriate route in accordance with the excessive length thereof on the service hole cover 40B.

Effect etc. of Embodiment 1

According to the door wiring modules 30, 30X, and 30Y having the above configurations, the route indication part indicates the plurality of routes each having the route length different from each other as the routes of the electrical wire 52B between the first position and the second position, and the electrical wire 52B is regulated to pass through any route selected from the plurality of routes. Accordingly, any route selected from the plurality of routes is applied to the route of the electrical wire using the longest electrical wire 52B in the specifications of the plurality of doors 10, 10X, and 10Y, thus the electrical wire 52B can deal with the specifications of the plurality of doors 10, 10X, and 10Y. Accordingly, common components can be used for the service hole cover 40 and the electrical wire 52B.

The route indication part includes the plurality of grooves 44B3 to 44B5 formed to extend along each of the plurality of routes on the main surface 41a of the cover body part 41 to house the electrical wire 52B, Accordingly, the electrical wire 52B is housed in a predetermined groove in the plurality of grooves 44B3 to 44B5, thereby being easily disposed along a predetermined route.

In the service hole cover 40B having the above configuration, the route indication part indicates the plurality of routes each having the route length different from each other as the routes, between the first position and the second position, of the electrical wire 52B disposed to pass through the first position and the second position on the cover body part 41. Accordingly, any route selected from the plurality of routes is applied to the route of the electrical wire using the longest electrical wire 52B in the specifications of the plurality of doors 10, 10X, and 10Y, thus the electrical wire 52B can deal with the specifications of the plurality of doors 10, 10X, and 10Y. Accordingly, common components can he used for the service hole cover 40B and the electrical wire 52B.

According to the method of manufacturing the door wiring modules 30, 30X, and 30Y having the above configurations, the route indication part indicates the plurality of routes each having the route length different from each other as the routes between the first position and the second position, and in the route regulation step, the route of the electrical wire 52B is regulated so that the electrical wire 52B passes through any route in the plurality of routes indicated by the route indication part as the route between the first position and the second position. Accordingly, any route selected from the plurality of routes is applied to the route of the electrical wire using the longest electrical wire 52B in the specifications of the plurality of doors 10, 10X, and 10Y, thus the electrical wire 52B can deal with the specifications of the plurality of doors 10, 10X, and 10Y. Accordingly, common components can be used for the service hole cover 40B and the electrical wire 52B.

Modification Example

Figure 6:
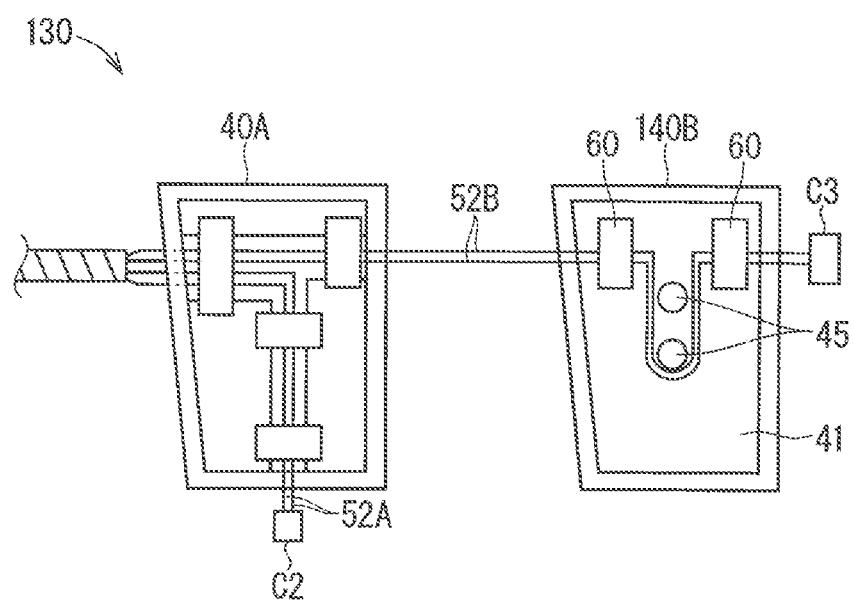
FIG. 6 is a plan view illustrating a first modification example of the door wiring module.
Figure 7:
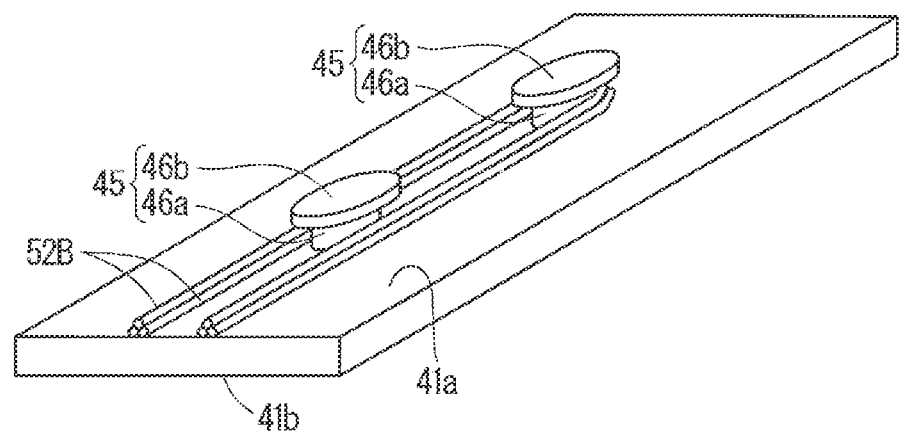
FIG. 7 is a partial-enlarged perspective view illustrating the door wiring module according to the first modification example.

FIG. 6 is a plan view illustrating a first modification example of the door wiring module 30. FIG. 7 is a partial-enlarged perspective view illustrating a door wiring module 130 according to the first modification example.

The door wiring module 130 according to the first modification example is different from the door wiring module 30 in that the route indication part provided to a service hole cover 140B is not the grooves 44B3 to 44B5. The route indication part is a fixing part 45 in the door wiring module 130. The fixing part 45 is formed in a position corresponding to each of the plurality of routes on the main surface 41a of the cover body part 41. The fixing part 45 is provided to he able to be fixed to the wiring member 50. FIG. 7 exemplifies a protrusion on which the wiring member 50 is caught as the fixing part 45. The fixing part 45 includes a columnar part 46a and a head part 46b. The columnar part 46a protrudes from the main surface 41a. The wiring member 50 is caught on the columnar part 46a. The head part 46b is provided to a tip end of the columnar part 46a. The head part 46b protrudes from the columnar part 46a to an outer peripheral side of the columnar part 46a to suppress the wiring member 50 coming out of the columnar part 46a.

However, the fixing part needs not be a protrusion. For example, the fixing part may be a clamp hole. A clamp attached to the wiring member 50 is fitted into the clamp hole to be fixed thereto, thus the wiring member 50 is fixed to the service hole cover.

Herein, the fixing part 45 is provided to a route absorbing the excessive length of the electrical wire 52B, that is to say, a route corresponding to the door panels 20 and 20X, and the fixing part 45 is not provided to a route in which the excessive length of the electrical wire 52B needs not be absorbed, that is to say, a route corresponding to the door panel 20Y. The fixing part 45 may also be provided to the route corresponding to the door panel 20Y.

The route indication part includes the fixing part 45 in the door wiring module 30 according to the present example. Accordingly, the wiring member 50 is fixed by a predetermined fixing part 45, thus the route thereof is easily kept in a state of being regulated to a predetermined route.

Figure 8:
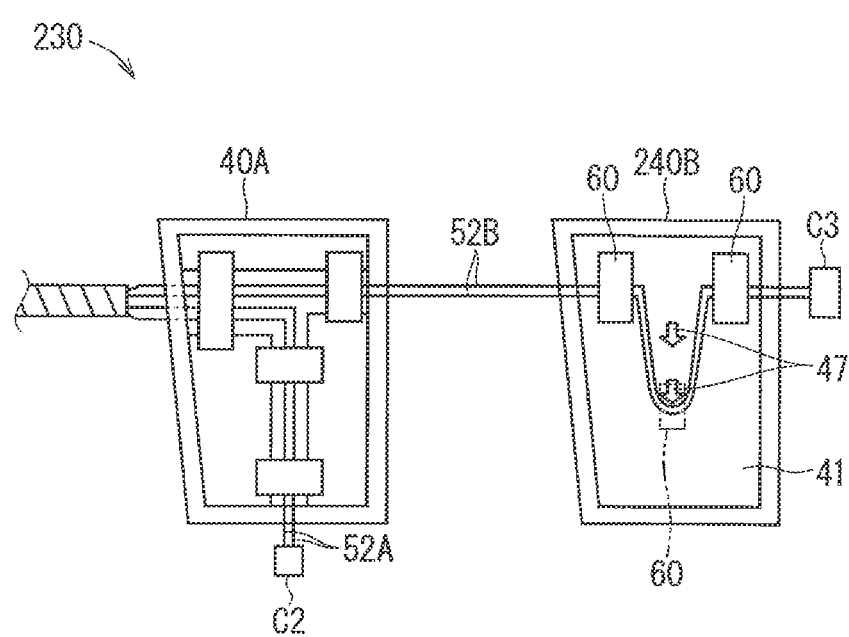
FIG. 8 is a plan view illustrating a second modification example of the door wiring module.

FIG. 8 is a plan view illustrating a second modification example of the door wiring module 30.

A door wiring module 230 according to the second modification example is different from the door wiring modules 30 and 130 in that the route indication part provided to a service hole cover 240B is not the grooves 44B3 to 44B5 and the fixing part 45. The route indication part is a mark 47 in the door wiring module 230. The mark 47 is formed in a position corresponding to each of the plurality of routes on the main surface 41a of the cover body part 41. The mark 47 does not have a function of housing the wiring member 50 as with the grooves 44B3 to 44B5 and a function of fixing the wiring member 50 as with the fixing part 45, but functions as simply a mark. In this case, it is sufficient that the wiring member 50 is attached at a position of the mark 47 by the wiring cover 60 or an attachment member such as an adhesive tape.

Herein, the mark 47 is provided to a route absorbing the excessive length of the electrical wire 52B, that is to say, a route corresponding to the door panels 20 and 20X, and the mark 47 is not provided to a route in which the excessive length of the electrical wire 52B needs not be absorbed, that is to say, a route corresponding to the door panel 20Y. The fixing part 45 may also be provided to the route corresponding to the door panel 20Y.

The route indication part includes the mark 47 in the door wiring module 230 according to the present example. Accordingly, the wiring member 50 is disposed along a predetermined mark 47, thereby being easily disposed along a predetermined route.

Figure 9:
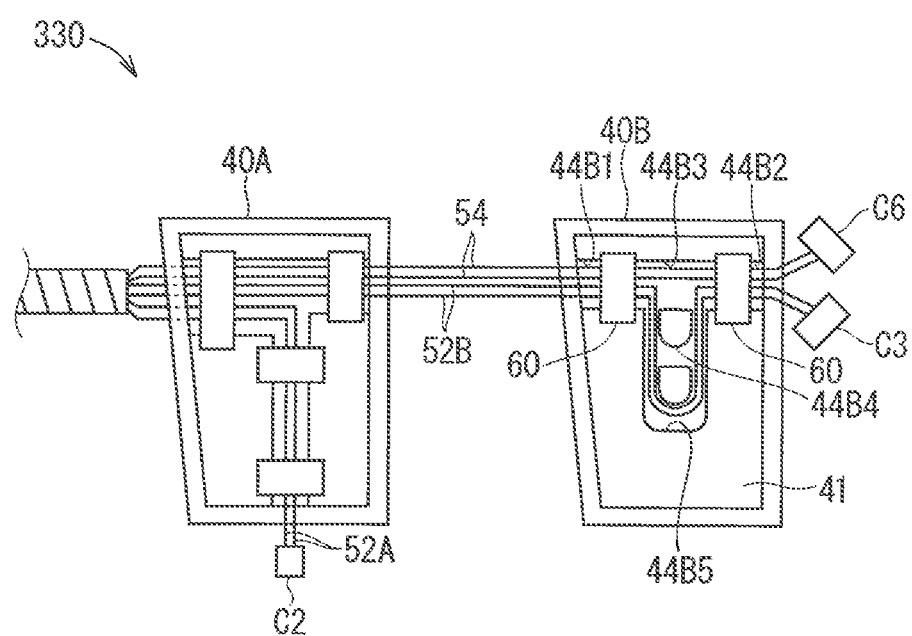
FIG. 9 is a plan view illustrating a third modification example of the door wiring module.

FIG. 9 is a plan view illustrating a third modification example of the door wiring module 30.

A door wiring module 330 according to the third modification example is different from the door wiring module 30 in that wiring members different from each other pass through two or more routes, respectively, in the plurality of routes indicated by the route indication part.

The door wiring module 330 further includes a dedicated wiring member 54 in addition to the wiring member 50 described above. The route of the electrical wire 52B in the wiring member 50 is regulated so that the electrical wire 52B passes through a first route in the plurality of routes. A route of the dedicated wiring member 54 is regulated so that the dedicated wiring member 54 passes through a second route in the plurality of routes.

The dedicated wiring member 54 is a wiring member especially designed for the specification of the door 10. Thus, the second route through which the dedicated wiring member 54 passes is generally a shortest route. A connector C6 on an end portion of the dedicated wiring member 54 is connected to a corresponding door apparatus.

The electrical wire 52B is a general wiring member provided regardless of the specifications of the doors 10, 10X, and 10Y. The first route through which the electrical wire 52B passes is longer than the second route in the door wiring module 330. As described above, the electrical wire 52B is set to have a length corresponding to the largest route length in the specifications of the plurality of doors 10, 10X, and 10Y. Thus, in the door wiring module 330 applied to the specifications of the doors 10 and 10X having the smaller route length than the largest route length in the specifications of the plurality of doors 10, 10X, and 10Y, the electrical wire 52B passes through the route having the larger route length than the shortest route in the plurality of routes, and the excessive length thereof is absorbed. Illustrated in FIG. 9 is an example that the door wiring module 330 is applied to the specification of the door 10 in the manner similar to the door wiring module 30.

In the door wiring module applied to the specification of the door 10Y having the largest route length in the specifications of the plurality of doors 10, 10X, and 10Y, the electrical wire 52B is regulated to pass through the first route as the shortest route which is the same as that of the dedicated wiring member 54.

In the present example, the door wiring module 330 further includes the dedicated wiring member 54, the route of the electrical wire 52B is regulated so that the electrical wire 52B passes through the first route in the plurality of routes, and the route of the dedicated wiring member 54 is regulated so that the dedicated wiring member 54 passes through the second route in the plurality of routes. For example, the wiring member passing through the first position and the second position may include the dedicated wiring member especially designed for each of specifications of the plurality of doors 10, 10X, and 10Y and the general wiring member commonly used in the specifications of the plurality of doors 10, 10X, and 10Y. In this case, the route of the electrical wire 52B as the general wiring member is changed, thus the dedicated wiring member 54 and the electrical wire 52B can be simply disposed along a predetermined route in the service hole cover 40B.

The configurations described in the embodiments and modification examples thereof can be appropriately combined as long as they are not contradictory. For example, both the grooves 44B3 to 44B5 and the fixing part 45 may be provided as the route indication parts.

EXPLANATION OF REFERENCE SIGNS

10, 10X, 10Y door
20, 20X, 20Y door panel
21 outer panel
22 inner panel
23 side plate part
25 main plate part
26 service hole
30, 30X, 30Y, 130, 230, 330 door wiring module
40, 40A, 40B, 140B, 240B service hole cover
41 cover body part
41a, 41b main surface
42 frame part
43 flange part
44, 44A1-44A3, 44B1-44B5 groove
45 fixing part
46a columnar part
46b head part
47 mark
48 convexed part 49 insertion hole
50 wiring member
52, 52A, 52B electrical wire
54 dedicated wiring member
60 wiring cover
61 first end portion
62 second end portion
63 intermediate portion
C1-C6 connector
G gourmet
T adhesive tape

The invention claimed is:

1. A door wiring module, comprising:
a service hole cover including a cover body part and a route indication part provided to the cover body part; and
a wiring member whose route is regulated so that the wiring member passes through a first position and a second position on the cover body part, wherein
the route indication part indicates a plurality of routes each having a route length different from each other as routes of the wiring member between the first position and the second position,
the route indication part includes a plurality of grooves in which the wiring member is housed, each of the plurality of grooves formed on a main surface of the cover body part to extend along each of the plurality of routes, and
a route of the wiring member is regulated to pass through any route selected from the plurality of routes.

2. The door wiring module according to claim 1, wherein the route indication part includes a fixing part formed in a position corresponding to each of the plurality of routes on the main surface of the cover body part to fix the wiring member.

3. A door wiring module, comprising:
a service hole cover including a cover body part and a route indication part provided to the cover body part; and
a wiring member whose route is regulated so that the wiring member passes through a first position and a second position on the cover body part, wherein
the route indication part indicates a plurality of routes each having a route length different from each other as routes of the wiring member between the first position and the second position,
the route indication part includes a mark formed in a position corresponding to each of the plurality of routes on a main surface of the cover body part, and
a route of the wiring member is regulated to pass through any route selected from the plurality of routes.

4. The door wiring module according to claim 1, wherein the route of the wiring member is regulated so that the wiring member passes through a first route in the plurality of routes, and the door wiring module further includes a dedicated wiring member whose route is regulated so that the dedicated wiring member passes through a second route in the plurality of routes.

5. A service hole cover, comprising:
a cover body part; and
a route indication part provided to the cover body part, wherein
the route indication part indicates a plurality of routes each having a route length different from each other as routes, between a first position and a second position, of a wiring member disposed to pass through the first position and the second position on the cover body part, and
the route indication part includes a plurality of grooves in which the wiring member is housed, each of the plurality of grooves formed on a main surface of the cover body part to extend along each of the plurality of routes.

\* \* \* \* \*